United States Patent
Poco et al.

[11] Patent Number: 6,158,244
[45] Date of Patent: Dec. 12, 2000

[54] METHOD OF PRODUCING OPTICAL QUALITY GLASS HAVING A SELECTED REFRACTIVE INDEX

[75] Inventors: John F. Poco; Lawrence W. Hrubesh, both of Livermore, Calif.

[73] Assignee: The Regents of the University of California, Oakland, Calif.

[21] Appl. No.: 09/039,450

[22] Filed: Mar. 16, 1998

[51] Int. Cl.$^7$ ..................................... C03B 8/02
[52] U.S. Cl. ............................................. 65/17.2
[58] Field of Search ........................... 65/17.2; 501/12, 501/54, 900, 903

[56] References Cited

U.S. PATENT DOCUMENTS

| | | | |
|---|---|---|---|
| 5,047,776 | 9/1991 | Baller | 342/52 |
| 5,076,980 | 12/1991 | Nogues et al. | 264/65 |
| 5,275,796 | 1/1994 | Tillotson et al. | 423/338 |
| 5,409,683 | 4/1995 | Tillotson et al. | 423/338 |
| 5,562,752 | 10/1996 | Fleming, Jr. | 65/384 |
| 5,684,907 | 11/1997 | Sprehn et al. | 385/123 |
| 5,686,031 | 11/1997 | Coronado et al. | 264/40.1 |

FOREIGN PATENT DOCUMENTS

| | | |
|---|---|---|
| 62-216930 | 9/1987 | Japan . |
| 63-17225 | 1/1988 | Japan . |

OTHER PUBLICATIONS

Journal of Non-Crystalline Solids 189 (1995) 197–211, Cavitation During Drying Of A Gel, George W. Scherer, Douglas M. Smith. (no month available).

The Physcis and Chemistry of Sol-Gel Processing, C. Jeffrey Brinker, SNLA, C. Jeffrey Brinker, George W. Scherer, Academic Press, Inc. Chapter 8, pp. 454–455. 1990 (no month available).

*Primary Examiner*—Sean Vincent
*Attorney, Agent, or Firm*—Daryl S. Grzybicki; Christopher J. Horgan; Alan H. Thompson

[57] ABSTRACT

Optical quality glass having a selected refractive index is produced by a two stage drying process. A gel is produced using sol-gel chemistry techniques and first dried by controlled evaporation until the gel volume reaches a pre-selected value. This pre-selected volume determines the density and refractive index of the finally dried gel. The gel is refilled with solvent in a saturated vapor environment, and then dried again by supercritical extraction of the solvent to form a glass. The glass has a refractive index less than the full density of glass, and the range of achievable refractive indices depends on the composition of the glass. Glasses having different refractive indices chosen from an uninterrupted range of values can be produced from a single precursor solution.

10 Claims, 1 Drawing Sheet

METHOD OF PRODUCING OPTICAL QUALITY GLASS HAVING A SELECTED REFRACTIVE INDEX

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to a method using sol-gel chemistry for making transparent, optical quality glass having a selected bulk refractive index.

2. Description of Related Art

Numerous methods have been developed for making porous solids having open pores, e.g., polymer foams, pre-ceramics, and porous glasses, including aerogels and xerogels. Aerogels and xerogels are of particular interest because of their nanometer-size pores, which are smaller than the wavelengths of visible light, resulting in transparency and other exceptional properties. U.S. Pat. Nos. 5,275,796, 5,409,683, and 5,686,031 describe processes for making inorganic aerogels and xerogels and other porous materials. U.S. Pat. No. 5,076,980 also discloses a method for making sol-gel monoliths.

Porous glasses can be used in a wide variety of optical applications, such as for graded refractive index lenses, waveguides, fiber optics, and high energy particle detectors. In these applications, controlling the index of refraction of the material is of particular interest. U.S. Pat. No. 5,047,776, for example, describes a Luneburg lens made of concentric dielectric shells of aerogel material having various indices of refraction. U.S. Pat. No. 5,684,907 describes an optical fiber surrounded by an aerogel cladding, whose index of refraction is close to that of air.

The index of refraction (n) of a porous glass is a function of the bulk density ($\rho$) of the material: $n=1+k\rho$. The constant k can be determined for a specific material from its full density values of n and $\rho$; i.e., $k=(n_s-1)/\rho_s$. For example, silica ($SiO_2$) has a bulk density of 2.2 $g/cm^3$ and an index of refraction of 1.46, so k has a value of 0.21 $cm^3/g$. Thus, in order to manufacture a porous glass with a specified refractive index, the density must be controlled. The density (or porosity) of the final product is determined by the concentration of initial reactants and the method used to dry the material.

U.S. Pat. Nos. 5,275,796, 5,409,683, and 5,686,031 (cited above) describe the formation of porous glasses using sol-gel chemistry using a precursor solution that is gelled and then dried by removing the liquid from a two-phase liquid-solid network. Ultralightweight materials, such as aerogels, are typically dried by extracting the liquid under supercritical conditions. Denser materials, called xerogels, are formed by evaporating the liquid under ambient conditions, which causes significant shrinkage (collapse) of the solid network. These methods require a separate solution for each different density material with reactants in specified proportions. These methods are further limited by not producing a full, uninterrupted range of possible densities (or refractive indices) while maintaining optical transparency.

This limitation is a result of the slow evaporation of imbibed liquid during the production of xerogels, which typically causes a structural rearrangement of the particles within the gel as it shrinks. At some point in this process, the particles within the gel begin to scatter the light passing through it and the gel becomes opaque, rather than fully transmitting light so that the gel is translucent. The gel is not fully dried when this occurs, so shrinkage normally continues and the density increases until the gel is dry. Thus, normal porous glass processing by evaporation to dryness cannot achieve certain densities in the range (for silica) less than 1.1 $g/cm^3$ (corresponding to a refractive index less than 1.23), nor can they produce transparent glass in this range.

The present invention addresses these limitations by providing a method that can produce optically transparent glasses with any specified index of refraction, particularly in the range of 1.05–1.28, and additionally, can produce glasses having a range of varying densities using a stock solution, rather than separate solutions for different glass densities.

SUMMARY OF THE INVENTION

It is an object of the present invention to provide a method for making transparent, optical quality glass having a specified bulk refractive index.

A further object of the invention is to provide a method that uses a single precursor solution to fabricate glasses that have a pre-selected refractive index chosen from a range of refraction indices or densities, thereby simplifying the manufacturing process.

Another object of the invention is to provide a method to make transparent glasses having an uninterrupted range of refractive indices, which is currently not achievable. The range of achievable refractive indices is determined by the composition and porosity of the glass; for silica glass, this range is about 1.05 to 1.28.

The invention basically involves a two stage drying process, where a gel is first partially dried by evaporation until the gel reaches a targeted volume. This volume determines the final density and refractive index of the finally dried glass. The gel is refilled with liquid solvent in a saturated vapor environment. The refilled gel is then dried by supercritically extracting the solvent from the pores to form a glass of pre-selected density and refractive index.

The present invention can be used to make glasses for a variety of optical applications, including relativistic particle detectors (e.g., for Cerenkov radiation), Luneburg lenses, fiber optics, and waveguides. Other objects and advantages of the present invention will become apparent from the following description and accompanying drawing.

BRIEF DESCRIPTION OF THE DRAWINGS

The accompanying drawing, which is incorporated into and forms part of this disclosure, illustrates the method of the present invention and together with the description, serves to explain the principles of the invention.

DETAILED DESCRIPTION OF THE INVENTION

Figure 1:
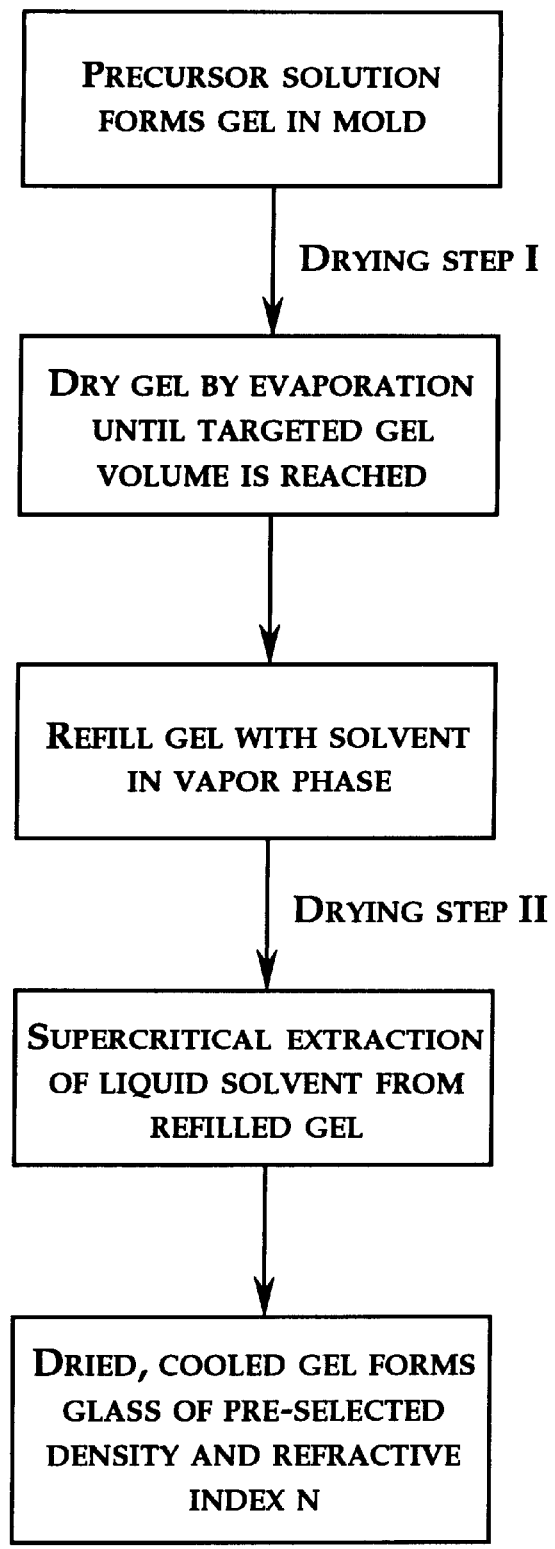
FIG. 1 is a flowchart of the method steps of the present invention.

The present invention is a method for making transparent, optical quality glass having a specified bulk refractive index in a range that is, less than the full density of glass. The refractive index is related directly to the density of the porous glass. The porosity of the glass is controlled by the drying process conditions, and the range of achievable refractive indices is determined by the composition of the particular glass (e.g., silica, alumina, zirconia, tantala, titania). FIG. 1 is a flowchart showing the basic steps of the present invention. The manufacture of selected refractive index materials requires starting from a known gel density. A variety of starting densities can be selected.

The glass is made using sol-gel reactants that are typically used in the production of porous materials such as aerogels and xerogels. Such processes are fully described in U.S. Pat. Nos. 5,275,796, 5,409,683, and 5,636,031, which are hereby incorporated by reference. In the first step, a metal alkoxide solution (e.g., tetramethoxysilane, titanium ethoxide) and other liquid reactants (e.g., an alcohol solvent, water, ammonium hydroxide) are combined in the proper proportions and mixed thoroughly, and the mixture is poured into and completely contained in a mold which defines the shape of the final material, although not its final size. The mold may be formed from a variety of materials, such as metal, glass, or plastic, with glass being preferred. The mold is sized larger than the required size of the final part, taking into account the volumetric shrinkage during drying.

The mixture, called the precursor solution, is allowed to form a gel (or "sol-gel") within the mold at room temperature. During gelzition, chemical reactions occur in the solution to form particles called "sols". The sols link until a connected solid structure (the gel) forms, which is surrounded by a liquid by-product of the same reactions. The gel typically forms in the mold in less than 12 hours. The two-phase gel consists of a porous, connected solid phase dispersed in a liquid phase. The starting density of the solid part of the gel is determined from the solid's mass and the volume occupied by the gel in the mold. Knowing the original mass of the solid and measuring the volume occupied by the gel as it shrinks, one can determine the size (volume) necessary to produce the desired, higher final density.

After gelation is complete, the gel is dried in two separate stages. First, the gel undergoes controlled partial drying by evaporation within the original mold, which removes the liquid from the pores and changes the porosity of the wet gel. The drying rate must be slow enough for the gel to stiffen due to continued reactions (i.e., syneresis) and to prevent cracking caused by capillary force induced stress, but still permit controlled shrinkage of the gel.

In general, although the small pore size in the gel results in useful physical properties, it also complicates the drying of wet gels. The pore sizes in the material are so small that the flow of liquid to the surface from within the gel is limited. In evaporative drying, the surface tension of the liquid in the small pores creates extremely high forces as the material dries, which tends to collapse the weak solid structure of the gel. The gels are typically not strong enough to resist this shrinkage during evaporation. The forces increase tremendously when the pores become less than one micrometer in diameter. For porous solids like aerogels and xerogels, whose average pore size is much less than one micron, evaporative drying is normally done extremely slowly to minimize cracking and shrinking. In the present invention, however, this shrinkage is desired and is used to an advantage to produce a full spectrum of densities for the finally dried material.

In the gel, the solid network is initially compliant so little tension develops in the early stages of drying. As soon as menisci of the liquid phase begin to form at the drying surface, the solid phase of the gel shrinks. As the gel contracts, it stiffens, and the tension in the liquid rises such that the rate of contraction of the gel equals the rate of evaporation. As drying proceeds, the shrinkage in the gel is equal to the volume of liquid evaporated. The change in volume is proportional to the loss of weight of the gel. The weight of the gel is a function of the volumes of the liquid and solid phases, and the densities of the liquid and solid phases. Thus, given the desired final density of the solid phase, the amount of evaporation (loss of liquid volume) needed to reach the target volume of the solid gel can be determined. (For further discussion on the theory behind the process of drying, see Scherer et al., *Jour. Non-Crystalline Solids,* 189: 197–211 (1995), and *Sol-Gel Science* by Brinker and Scherer, Academic Press, New York (1990).)

The liquid in the gel pores is removed by controlled evaporation at room temperature and atmospheric pressure through an opening (or openings) in the mold. The rate of evaporation is controlled by limiting the area of the orifice(s) and/or the length of the mold (i.e., the surface area of drying), or by using gas permeable membranes instead of openings. In addition, the amount of evaporation is controlled, and drying is terminated when the gel volume reaches the pre-selected, targeted value. The targeted value is calculated so as to achieve the desired density of the finally dried gel. Since the shrinkage of the gel can be calculated knowing various parameters including the rate of evaporation, the amount of required drying time can be calculated knowing the targeted gel volume. After the gel has been dried for the calculated amount of time, the evaporative process is stopped. The extent of drying can be visually monitored by observing the size of the gel as it shrinks.

The gel should be within a container that allows a visual observation of at least one linear dimension of the gel. The gel shrinkage will be the same linear percentage in all directions. The "new" volume can then be calculated from the percentage change from the original linear dimension. The original mass of the gel divided by the "new" volume produces a new higher density (since there is little, if any, loss of mass). Knowing the final target density, the evaporation (and therefore, the shrinkage) can be interrupted when the new desired density is achieved. The total time required for partial drying varies from days to weeks, depending on the targeted final density and index of refraction.

Because the amount of evaporation time, and thus shrinkage of the gel, can be controlled and varied, a range of densities can be targeted using a single precursor solution with a given concentration of metal alkoxide. Therefore, it is not necessary to prepare a separate metal alkoxide mixture for each target density. Greater target densities are achieved by increasing the extent of evaporative drying to further collapse the gel structure to the appropriate volume. Thus, the present method allows processing of ultrafine pore materials of various densities and refraction indices for mass production, thereby making the manufacture of these types of materials more cost-effective.

After the targeted gel volume is reached, the volume of the gel can be fixed by covering the gel with liquid solvent and performing supercritical drying. However, the gel cannot contact liquid solvent at this point without being damaged (e.g., cracking). Thus, the partially dried gel must be refilled with an alcohol solvent without stressing the gel. Stress can be caused by liquid wicking into the tiny pores. The partially filled gel is refilled by introducing solvent in its vapor phase into the mold through the openings until the gel is in a saturated environment of solvent vapor at approximately one atmosphere and at 25° C. Alternatively, the gel is placed in a container with a saturated atmosphere of the solvent. The vapor penetrates the gel pores and condenses inside the pores of the gel. The process continues until the gel has refilled with liquid solvent without sustaining cracks. The time required to refill the gel varies from hours to days, depending on the size and porosity of the glass part and the temperature of the solvent atmosphere.

After sufficient time to thoroughly re-wet the gel, additional liquid solvent is added to completely cover the gel. At this point, the gel is ready to be supercritically dried; little or no additional shrinkage occurs, and the final dried gel has the targeted density/refractive index. In this second stage of drying, the refilled gel is dried by extracting the solvent under supercritical conditions, in which the pore liquid is heated under pressure to a supercritical fluid. This procedure reduces the interfacial tension between the liquid and the gel so that the liquid can be removed without cracking or additional shrinkage of the gel. The wet gel in the mold is placed within a pressure vessel (autoclave), where the temperature and pressure are increased above the critical point of the fluid in the pores. The pressure of the critical fluid is released from the mold and the vessel until drying is complete, which normally requires many hours. After final drying, the gel is cooled while the mold and the vessel are purged with air.

The final glass parts are optically clear and free of cracks. The density of silica glass can range from about 0.3 g/cm$^3$ to greater than 1.3 g/cm$^3$. The refractive indices achieved for silica in this density range vary from 1.06 to 1.28.

EXAMPLE I

As a typical example, the procedure to produce a porous silica glass having a refractive index of 1.12 (i.e., bulk density≈0.57 g/cm$^3$) begins by mixing two solutions, Part A and Part B. Part A consists of 152 grams of tetramethoxysilane (TMOS) and 28 grams of methyl alcohol. Part B consists of 36 grams of water, 28 grams of methyl alcohol, and 10 microliters of concentrated ammonium hydroxide. Parts A and B are mixed and stirred for about 10 minutes, and then poured into a glass mold having a capacity to hold about 300 mL of liquid. The gel sets up in the mold within two hours; the approximate volume occupied by the gel in the mold is 250 cm$^3$. The mold is covered and sealed with a thin plastic sheet; a single hole having an area of approximately 0.08 cm$^2$ is punched in the sheet. The mold is stored in a ventilated area while drying. The shrinkage of the gel is monitored daily and the linear shrinkage is measured for the largest dimension of the gel.

When the gel has shrunken to a volume of 105 cm$^3$ (as, determined by measurement and proportional changes of all linear dimensions), the plastic cover is removed and the mold is placed in the headspace of a desiccator that contains about 200 mL of methyl alcohol. The desiccator is covered and allowed to set at room temperature. Approximately one week is required for the gel to be completely re-filled with methyl alcohol. The mold is removed from the desiccator, and additional methyl alcohol is poured in the mold to completely cover the gel. The mold is then placed directly in an autoclave for the purpose of supercritical extraction of the alcohol. Alternatively, the mold is again sealed with a new, non-porous plastic cover and stored for later supercritical extraction of the solvent. The resulting dried gel has a volume of approximately 105 cm$^3$, a bulk density of about 0.57 g/cm$^3$, and a refractive index of approximately 1.12.

The foregoing description of preferred embodiments of the invention is presented for purposes of illustration and description and is not intended to be exhaustive or to limit the invention to the precise form disclosed. Many modifications and variations are possible in light of the above teaching.

The invention claimed is:

1. A method for producing optical quality glass having a selected refractive index, comprising:

provinding a gel in a mold, wherein the gel has a solid phase with pores containing a liquid;

partially drying the gel in the mold by evaporating liquid from the gel's pores until the gel's volume reaches a pre-selected value;

refilling the pores in the partially dried gel with a solvent; and drying the gel filled with solvent by removing the solvent under supercritical conditions to form a transparent glass article having a pre-selected refractive index.

2. The method as recited in claim 1, wherein partially drying the gel is carried out by controlled evaporation.

3. The method as recited in claim 1, wherein refilling the gel is carried out using the solvent in its vapor phase.

4. The method as recited in claim 1, wherein refilling the gel is carried out by placing the gel in a saturated environment of solvent vapor.

5. The method as recited in claim 1, wherein refilling the gel is carried out using an alcohol solvent.

6. The method as recited in claim 1, further comprising providing a single precursor solution which forms the gel, and further comprising forming a second glass article having a pre-selected refractive index different from the first glass article, wherein both glass articles are produced from the single precursor solution.

7. The method as recited in claim 1, further comprising providing a precursor solution which forms the gel, wherein the precursor solution comprises at least one metal alkoxide.

8. The method as recited in claim 7, wherein the metal alkoxide comprises a metal selected from silicon, aluminum, titanium, zirconium, and tantalum.

9. The method as recited in claim 1, wherein the glass article comprises silica and the pre-selected refractive index is in the range of about 1.05 to about 1.28.

10. The method as recited in claim 1, further comprising covering the gel with liquid solvent before drying the gel under supercritical conditions.

* * * * *